United States Patent Office 3,097,204
Patented July 9, 1963

---

3,097,204
DERIVATIVES OF BENZOTHIADIAZINE-1,1-DIOXIDE COMPOUNDS
Frederick C. Novello, Berwyn, and James M. Sprague, Gwynedd Valley, Pa., assignors to Merck & Co., Inc., Rahway, N.J., a corporation of New Jersey
No Drawing. Filed Feb. 1, 1960, Ser. No. 5,654
10 Claims. (Cl. 260—243)

This invention comprises novel benzothiadiazine-1,1-dioxide compounds containing as a substituent attached to the 7-position carbon atom an N-acylsulfonamide group and, in addition, at least one other substituent attached to the 6-position carbon of the benzothiadiazine nucleus. The benzothiadiazine nucleus can be either unsaturated, that is the 1,2,4-benzothiadiazine nucleus, or the heterocyclic portion thereof can be saturated, that is the 3,4-dihydro-1,2,4-benzothiadiazine nucleus. The invention also embraces a novel method for preparing these compounds.

The novel compounds of this invention can be considered to have one of the general structures:

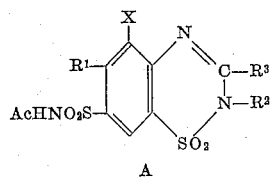   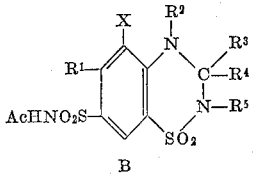

A                        B and includes the alkali metal salts thereof, wherein $R^1$ represents a halogen or a halogen-like radical such as chlorine, bromine, fluorine, trihalomethyl as trifluoromethyl, trichloromethyl and the like, a lower alkyl radical advantageously having from 1 to 5 carbon atoms, a lower alkoxy radical preferably having from 1 to 5 carbon atoms, and the nitro group; X represents hydrogen or a halogen, preferably chlorine, bromine, or iodine; $R^2$ represents hydrogen or a lower alkyl radical advantageously having from 1 to 5 carbon atoms; $R^3$ also represents hydrogen or a lower alkyl radical having for example from 1 to 12 carbon atoms and either unsubstituted or having a halogen substituent attached to the lower alkyl group such as the trichloromethyl, or a phenyl or phenalkyl radical which also can be unsubstituted or substituted with a halogen, such as chlorine, attached to the phenyl moiety; $R^4$ represents hydrogen or a lower alkyl radical preferably having from 1 to 5 carbon atoms which also can be unsubstituted or halo substituted, or $R^3$ and $R^4$ can be joined together to form, with the 3-position carbon atom to which they are attached, a cycloaliphatic ring preferably having 5 or 6 carbon atoms for example, the pentamethylene group; $R^5$ represents hydrogen or a lower alkyl having from 1 to 5 carbon atoms; and Ac represents an acyl radical preferably derived from a monocarboxylic acid which can be aliphatic, aromatic or heterocyclic, for example, a saturated or unsaturated lower aliphatic monocarboxylic acid preferably having from 2 to 6 carbon atoms, such as acetic acid, butyric acid, caproic acid or a cycloaliphatic acid such as cyclohexylcarboxylic acid and the like, benzoic acid, phenylacetic acid, a heterocarboxylic acid as thiophene carboxylic acid, pyridine carboxylic acid and the like.

The salts of the foregoing compounds also are embraced within the scope of this invention and in particular the alkali metal salts thereof.

The novel compounds of this invention are of particular interest because their diuretic, natriuretic, and/or saluretic action is produced over a longer period than occurs with most diuretics of the benzothiadiazine family. The compounds are effective upon oral administration in the form of tablets or capsules or the like as well as upon injection when dissolved in a dilute alkaline medium or in polyethyleneglycol. The pharmacotherapeutic properties of these compounds make them particularly useful in the treatment of congestive heart failure and other abnormalities which produce an edematous condition in the body or which produce an imbalance in the electrolyte concentration in the body, for example, those in which retention of sodium occurs. The compounds having the above structural formula wherein $R^1$ is a halogen radical, especially the chlorine or trifluoromethyl radical, and within this group of compounds those wherein $R^2$, $R^3$, $R^4$, and $R^5$ each is a hydrogen atom are of particular interest as long-acting diuretic agents.

The novel compounds of this invention can be prepared by treating a 6-$R^1$-7-sulfamyl-1,2,4-benzothiadiazine-1,1-dioxide or the corresponding 3,4-dihydro compound with the selected carboxylic acid in the form of its acid halide, such as the acid chloride, or in the form of its anhydride. The reaction preferably is carried out in the presence of pyridine at room temperature. Solvents, such as dioxane, benzene, and the like also can be added to the reaction mixture if desired although this is not essential in effecting the acylation of the 7-sulfamyl group.

The 6-$R^1$-7-acylsulfamyl-3,4-dihydro-1,2,4-benzothiadiazine-1,1-dioxides also can be prepared by catalytic reduction of 6-$R^1$-7-acylsulfamyl-1,2,4-benzothiadiazine-1,1-dioxide, advantageously in the presence of ruthenium.

The alkali metal salts of the novel compounds of this invention can be prepared by dissolving the selected compound in an aqueous or alcoholic solution of the alkali metal hydroxide and, if desired, isolating the salt by evaporating the solvent. Any of the conventional alkali metal salts such as the sodium, potassium, lithium or the like salt can be prepared by this method or by other methods known to organic chemists.

The 1,2,4-benzothiadiazine-1,1-dioxide starting materials can be prepared by one or another of the methods described in U.S. Patent Nos. 2,809,194 and 2,910,473, and the 3,4-dihydro-1,2,4-benzothiadiazine-1,1-dioxide starting materials can be prepared by one or another of the methods described in copending U.S. patent application Serial No. 763,470, which methods, in essence, involve reacting a sulfamyl orthanilamide, such as the disulfamylanilines described in U.S. Patent 2,809,194, with an aldehyde, acetal, ketone or ketal to give the 3,4-dihydro compound. The benzothiadiazines, whether unsaturated or saturated, also can be prepared by other known methods such as those described by Freeman and Wagner, Journal of Organic Chemistry, volume 16, page 815 (1951), or by the methods described by Parke et al., in the 1950 issue of the Journal of the Chemical Society, page 60, or by the methods described in one or more of the papers referred to in the bibliography of either one of these Journal references.

The preparation of the novel compounds of this invention is more fully described in the following examples. It is to be understood, however, that the examples are illustrative of the compounds embraced by this invention and are not to be construed as limiting the invention to the particular compounds or the particular reaction conditions specifically described.

EXAMPLE 1

*7-Acetylsulfamyl-6-Chloro-1,2,4-Benzothiadiazine-1,1-Dioxide*

Acetic anhydride (25 ml.) is added to a suspension of 8.9 g. (0.03 mole) of 6-chloro-7-sulfamyl-1,2,4-benzothiadiazine-1,1-dioxide in 75 ml. of pyridine at room temperature. After standing at room temperature overnight, the product is collected, washed with alcohol and recrystallized from an ethanol-water mixture to give 7-acetylsulfamyl-6-chloro-1,2,4-benzothiadiazine-1,1-dioxide, the melting point of which is dependent upon the rate of heating; rapid heating giving a melting point of 299° C.; slow heating giving M.P. 289° C.

*Analysis.*—Calculated for $C_9H_8ClN_3O_5S_2$: C, 32.00; H, 2.39; N, 12.44. Found: C, 32.20; H, 2.56; N, 12.36.

EXAMPLE 2

*7-Butyrylsulfamyl-6-Chloro-1,2,4-Benzothiadiazine-1,1-Dioxide*

Butyric anhydride (25 ml.) is added to a suspension of 8.9 g. (0.03 mole) of 6-chloro-7-sulfamyl-1,2,4-benzothiadiazine-1,1-dioxide in 75 ml. of pyridine at room temperature. After standing at room temperature overnight, the solution is poured into 200 ml. of ice water and acidified with concentrated hydrochloric acid. The solid which separates is collected, washed with water and recrystallized from an ethanol-water mixture to give 7-butyrylsulfamyl-6-chloro-1,2,4-benzothiadiazine-1,1-dioxide, M.P. 286° C.

*Analysis.*—Calculated for $C_{11}H_{12}ClN_3O_5S_2$: C, 36.11; H, 3.31; N, 11.49. Found C, 36.31; H, 3.38; N, 11.47.

EXAMPLE 3

*7-Caproylsulfamyl-6-Chloro-1,2,4-Benzothiadiazine-1,1-Dioxide*

By replacing the acetic anhydride employed in Example 1 by caproic acid anhydride (25 ml.) and following substantially the same procedure described in Example 1, there is obtained 7-caproylsulfamyl-6-chloro-1,2,4-benzothiadiazine-1,1-dioxide, M.P. 245–245.5° C.

*Analysis.*—Calculated for $C_{13}H_{16}ClN_3O_5S_2$: C, 39.64; H, 4.09; N, 10.67. Found: C, 40.30; H, 4.20; N, 9.91.

EXAMPLE 4

*7-Benzoylsulfamyl-6-Chloro-1,2,4-Benzothiadiazine-1,1-Dioxide*

By replacing the acetic anhydride employed in Example 1 by an equal volume of benzoyl chloride and following substantially the same procedure described in Example 1, there is obtained 7-benzoylsulfamyl-6-chloro-1,2,4-benzothiadiazine-1,1-dioxide, M.P. 287° C.

*Analysis.*—Calculated for $C_{14}H_{10}ClN_3O_5S_2$: C, 42.06; H, 2.52; N, 10.51. Found: C, 43.45; H, 2.36; N, 10.15.

EXAMPLE 5

*6-Chloro-2-Methyl-7-Nicotinylsulfamyl-1,2,4-Benzothiadiazine-1,1-Dioxide*

*Step A.*—One hundred grams of 5-chloroaniline-2,4-disulfonyl chloride is added to 200 ml. of 40% aqueous methylamine in portions with cooling. The solution is heated on a steam bath for one hour, cooled, and the product that crystallizes is separated by filtration. The crude product is dissolved in dilute (5%) sodium hydroxide and reprecipitated with dilute hydrochloric acid yielding 84.5 g. of 2,4-bis(methylsulfamyl)-5-chloroaniline, M.P. 176–178° C.

*Step B.*—One hundred grams of 2,4-bis(methylsulfamyl)-5-chloroaniline, obtained as described above, and 200 ml. of ethyl-orthoformate are heated in an open flask at 130–135° C. for 1½ hours. After cooling, the product that precipitates is separated by filtration, yielding 98.2 g. of 2-methyl-6-chloro-7-methylsulfamyl-1,2,4-benzothiadiazine-1,1-dioxide, M.P. 217–219° C. Purification is accomplished by dissolving the product in 200 ml. of hot dimethylformamide, diluting with 500 ml. of alcohol and cooling whereupon 80.6 g. of product is obtained, M.P. 221–223° C.

*Step C.*—A solution of 68.3 g. of the thus obtained 2-methyl-6-chloro-7-methylsulfamyl-1,2,4-benzothiadiazine-1,1-dioxide in 150 ml. of chlorosulfonic acid is heated for 5 hours on the steam bath (95° C.) The solution then is cooled and poured onto crushed ice thereby forming a precipitate which is removed by filtration and air dried. After recrystallization from a mixture of acetone-hexane, there is obtained 43.2 g. of 2-methylsulfamyl-5-chloroaniline-4-sulfonyl chloride, M.P. 159–162° C.

*Step D.*—The sulfonyl chloride obtained as described in Step C is added to 250 ml. of 28% ammonium hydroxide and the solution heated on the steam bath for one hour. After cooling there is obtained 25.3 g. of 2-methylsulfamyl-4-sulfamyl-5-chloroaniline, M.P. 185–188° C. Recrystallization from water raises the melting point to 189–191° C. An isomorphic form exists that melts at 168–170° C.

*Step E.*—By replacing the benzothiadiazine and the acetic anhydride employed in Example 1 by equivalent quantities of the thus obtained 2-methyl-6-chloro-7-sulfamyl-1,2,4-benzothiadiazine-1,1-dioxide and the acid chloride of pyridine-3-carboxylic acid, and following substantially the same procedure as described in Example 1, there is obtained 6-chloro-2-methyl-7-nicotinylsulfamyl-1,2,4-benzothiadiazine-1,1-dioxide.

EXAMPLE 6

*6-Bromo-7-Crotonylsulfamyl-1,2,4-Benzothiadiazine-1,1-Dioxide*

By replacing the benzothiadiazine and the acetic anhydride employed in Example 1 by equivalent quantities of 6-bromo-7-sulfamyl-1,2,4-benzothiadiazine-1,1-dioxide and crotonic acid anhydride and following substantially the same procedure described in Example 1, there is obtained 6-bromo-7-crotonylsulfamyl-1,2,4-benzothiadiazine-1,1-dioxide.

EXAMPLE 7

*7-Cyclohexylcarbonylsulfamyl-6-methoxy-1,2,4-Benzothiadiazine-1,1-Dioxide*

By replacing the benzothiadiazine and the acetic anhydride employed in Example 1 by equivalent quantities of 6-methoxy-7-sulfamyl-1,2,4-benzothiadiazine-1,1-dioxide and the acid chloride of cyclohexylcarboxylic acid and following substantially the same procedure described in Example 1, there is obtained 7-cyclohexylcarbonylsulfamyl-6-methoxy-1,2,4-benzothiadiazine-1,1-dioxide.

EXAMPLE 8

*7-Acetylsulfamyl-6-Chloro-3-Propyl-1,2,4-Benzothiadiazine-1,1-Dioxide*

By replacing the benzothiadiazine employed in Example 1 by an equivalent quantity of 6-chloro-3-propyl-7-sulfamyl-1,2,4-benzothiadiazine-1,1-dioxide, and following substantially the same procedure described in Example 1, there is obtained 7-acetylsulfamyl-6-chloro-3-propyl-1,2,4-benzothiadiazine-1,1-dioxide.

EXAMPLE 9

*7-Acetylsulfamyl-6-Fluoro-3-Benzyl-1,2,4-Benzothiadiazine-1,1-Dioxide*

By replacing the benzothiadiazine employed in Example 1 by an equivalent quantity of 6-fluoro-3-benzyl-7-sulfamyl-1,2,4-benzothiadiazine-1,1-dioxide, and following substantially the same procedure described in Example 1, there is obtained 7-acetylsulfamyl-6-fluoro-3-benzyl-1,2,4-benzothiadiazine-1,1-dioxide.

EXAMPLE 10

*7-Acetylsulfamyl-6-Chloro-3-Phenyl-1,2,4-Benzothiadiazine-1,1-Dioxide*

By replacing the benzothiadiazine employed in Example 1 by an equivalent quantity of 6-chloro-3-phenyl-7-sulfamyl-1,2,4-benzothiadiazine-1,1-dioxide, and following substantially the same procedure described in Example 1, there is obtained 7-acetylsulfamyl-6-chloro-3-phenyl-1,2,4-benzothiadiazine-1,1-dioxide.

EXAMPLE 11

6-Methyl-7-(N-Phenylacetyl)Sulfamyl-1,2,4-Benzothiadiazine-1,1-Dioxide

By replacing the benzothiadiazine and the acetic anhydride employed in Example 1 by equivalent quantities of 6-methyl-7-sulfamyl - 1,2,4 - benzothiadiazine-1,1-dioxide and the acid chloride of phenylacetic acid, and following substantially the same procedure described in Example 1, there is obtained 6-methyl-7-(N-phenylacetyl)sulfamyl-1,2,4-benzothiadiazine-1,1-dioxide.

EXAMPLE 12

6-Nitro-7(α-Thiophenecarbonyl)Sulfamyl-1,2,4-Benzothiadiazine-1,1-Dioxide

By replacing the benzothiadiazine and the acetic anhydride employed in Example 1 by equivalent quantities of 6-nitro - 7 - sulfamyl - 1,2,4 - benzothiadiazine-1,1-dioxide and the acid chloride of α-thiophenecarboxylic acid, and following substantially the same procedure described in Example 1, there is obtained 6-nitro-7-(α-thoiphenecarbonyl)sulfamyl-1,2,4-benzothiodiazine-1,1-dioxide.

EXAMPLE 13

7-Butyrylsulfamyl-6-Trifluoromethyl-1,2,4-Benzothiadiazine-1,1-Dioxide

Step A.—2-amino - 4 - trifluoromethylbenzenesulfonic acid (32 g., 0.132 mole) is added portionwise with stirring to 100 ml. of chlorosulfonic acid, cooled in an ice-bath over a 5–10 minute period. The solution is heated in an oil bath at 150° C. for 3 hours and then cooled to 20° C. Thionyl chloride (40 ml.) is added and the mixture heated on the steam bath for one hour, then cooled to 0° C. and poured cautiously onto ice. The aqueous liquor is decanted and the residual solid heated on the steam bath with 500 ml. of 28% ammonium hydroxide for 2 hours. Upon cooling, the product is collected on the filter, washed with water, and dried. To remove a trace amount of 2-sulfamyl-5-trifluoromethylaniline that is obtained along with the product, the material remaining on the filter is digested with 500 ml. of boiling benzene, filtered, and the benzene-soluble material recrystallized from aqueous alcohol, yielding 2,4-disulfamyl-5-trifluoromethylaniline as colorless needles, M.P. 241–242° C.

Step B.—A solution of 2 g. of the thus obtained 2,4-disulfamyl-5-trifluoromethylaniline in 25 ml. of 98–100% formic acid is heated under reflux for two hours. After removal of 10–15 ml. of solvent by distillation, the mixture is cooled in an ice bath and the end product collected and crystallized from alcohol-hexane yielding 6-trifluoromethyl-7-sulfamyl - 1,2,4 - benzothiadiazine-1,1-dioxide as colorless needles, M.P. 294–295° C.

Step C.—By replacing the benzothiadiazine employed in Example 2 by an equivalent quantity of the 6-trifluoromethyl-7-sulfamyl - 1,2,4 - benzothiadiazine-1,1-dioxide, obtained as described above, and following susbtantially the same procedure described in Example 2, there is obtained 7 - butyrylsulfamyl-6-trifluoromethyl-1,2,4-benzothiadiazine-1,1-dioxide.

EXAMPLE 14

7-Butyrylsulfamyl-6-Trifluoromethyl-3,4-Dihydro-1,2,4-Benzothiadiazine-1,1-Dioxide The 7 - butyrylsulfamyl-6-trifluoromethyl-1,2,4-benzothiadiazine-1,1-dioxide, obtained as described in Example 13, is added to methanol and then hydrogenated in the presence of ruthenium on carbon under a pressure of 30 lbs. per square inch gauge pressure until the theoretical amount of hydrogen has been taken up. The product thus obtained is recrystallized from a mixture of methanol and water yielding 7-butyrylsulfamyl-6-trifluoromethyl-3,4-dihydro-1,2,4-benzothiadiazine-1,1-dioxide.

EXAMPLE 15

7-Butyrylsulfamyl-6-Chloro-3,4-Dihydro-1,2,4-Benzothiadiazine-1,1-Dioxide

Ten grams of 7-butyrylsulfamyl-6-chloro-1,2,4-benzothiadiazine-1,1-dioxide, obtained as described in Example 2, is added to 275 ml. of methanol and hydrogenated at room temperature and under 40 p.s.i. gauge pressure in the presence of 4 grams of ruthenium on carbon until slightly over the theoretical amount of hydrogen has been taken up. The product thus obtained then is crystallized from a mixture of 120 ml. of methanol and 12 ml. of water which has been heated, filtered hot, and the filtrate then diluted with 500 ml. of distilled water whereupon crystals of 7-butyrylsulfamyl-6-chloro-3,4-dihydro-1,2,4-benzothiadiazine-1,1-dioxide is obtained, M.P. 229° C.

Each of the 7-acylsulfamyl-1,2,4-benzothiadiazine-1,1-dioxide compounds obtained as described in Examples 1 through 13 can be reduced by substantially the same method described in Example 14 or 15 to yield the corresponding 7-acylsulfamyl-3,4-dihydro-1,2,4-benzothiadiazine-1,1-dioxide. Complete examples of the preparation of the corresponding dihydro compounds are not included as to do so would serve only to lengthen the disclosure unnecessarily.

EXAMPLE 16

7-Butyrylsulfamyl-6-Butyl-4-Propyl-3,4-Dihydro-1,2,4-Benzothiadiazine-1,1-Dioxide Step A.—5-butyl-2,4-disulfamyl-N-propylaniline (0.02 mole, prepared from 5-butyl-N-propylaniline-2,4-disulfonyl chloride by reaction with an excess of four equivalents of ammonia in the form of ammonium hydroxide) in 50 ml. of 90% ethanol containing 300 mg. of sodium hydroxide is heated on the steam bath with 2 g. of 37% formaldehyde solution for 1.5 hours. The solution is acidified to litmus with 6 N hydrochloric acid and the solvent then removed by distillation until solid begins to separate. After cooling in an ice bath, the solid is collected on the filter and washed with water yielding 6-butyl - 4-propyl-7-sulfamyl-3,4-dihydro-1,2,4-benzothiadiazine-1,1-dioxide.

Step B.—By replacing the benzothiadiazine employed in Example 2 by an equivalent quantity of the dihydro compound obtained as described above, and following substantially the same procedure described in Example 2, there is obtained 7-butyrylsulfamyl-6-butyl-4-propyl-3,4-dihydro-1,2,4-benzothiadiazine-1,1-dioxide.

EXAMPLE 17

7-Butyrylsulfamyl-6-Chloro-3-Trichloromethyl-3,4-Dihydro-1,2,4-Benzothiadiazine-1,1-Dioxide Step A.—5-chloro-2,4-disulfamylaniline (5.7 g., 0.02 mole) is dissolved in 10 ml. of dimethylformamide and heated on the steam bath with 8.8 g. (0.06 mole) of chloral for 24 hours. The solution is cooled and diluted with water and the precipitate is collected and dried. Recrystallization from an acetone-chloroform mixture gives 3 - trichloromethyl-6-chloro-7-sulfamyl-3,4-dihydro-1,2,4-benzothiadiazine-1,1-dioxide.

Analysis.—Calculated for $C_8H_7Cl_4N_3O_4S_2$: C, 23.15; H, 1.70; N, 10.12. Found: C, 23.95; H, 1.92; N, 10.12.

Step B.—By employing equimolar quantities of the thus obtained product and butyric anhydride, and following substantially the same procedure described in Example 2, there is obtained 7-butyrylsulfamyl-6-chloro-3-trichloromethyl-3,4-dihydro-1,2,4-benzothiadiazine-1,1-dioxide.

EXAMPLE 18

7-Butyrylsulfamyl-6-Chloro-3,3-Pentamethylene-3,4-Dihydro-1,2,4-Benzothiadiazine-1,1-Dioxide Step A.—A solution of 5.7 g. (0.02 mole) of 5-chloro-2,4-disulfamylaniline and 5.9 g. (0.06 mole) of cyclohexanone in 30 ml. of dimethylformamide is heated on the steam bath with 2.32 g., (0.04 mole) of anhydrous potassium fluoride for 2 hours. After filtering, the solution is diluted with 100 ml. of water and cooled. The precipitate is collected on the filter, washed with alcohol, and dried to give 6-chloro-3,3-pentamethylene-7-sulfamyl-3,4-dihydro-1,2,4-benzothiadiazine-1,1-dioxide.

Analysis.—Calculated for $C_{12}H_{16}ClN_3O_4S_2$: C, 39.39; H, 4.41; N, 11.49. Found: C, 39.70; H, 4.60; N, 11.35.

Step B.—By using equal molecular quantities of the thus obtained product and butyric anhydride and following substantially the same procedure described in Example 2, there is obtained 7-butyrylsulfamyl-6-chloro-3,3-pentamethylene-3,4-dihydro-1,2,4-benzothiadiazine-1,1-dioxide.

EXAMPLE 19

*7-Butyrylsulfamyl-5,6-Dichloro-1,2,4-Benzothiadiazine-1,1-Dioxide*

Step A.—A solution of 25.7 g. (0.09 mole) of 5-chloro-2,4-disulfamylaniline in a mixture of 100 ml. of water, 200 ml. of glacial acetic acid and 150 ml. of concentrated hydrochloric acid is treated with 9 ml. of 30% hydrogen peroxide at 75–80° and allowed to cool to room temperature (2 hours). The mixture is cooled and the crystalline precipitate collected, washed with water, and recrystallized from ethanol-water to give 5,6-dichloro-2,4-disulfamylaniline, M.P. 289° C.

Analysis.—Calculated for $C_6H_7Cl_2N_3O_4S_2$: C, 22.51; H, 2.20; N, 3.12. Found: C, 22.65; H, 2.34; N, 3.16.

Step B.—A solution of 2.5 g. of 5,6-dichloro-2,4-disulfamylaniline in 50 ml. of anhydrous formic acid is heated under reflux for 24 hours. The solution is concentrated to one-half its volume, cooled in an ice bath and the product collected on the filter. Recrystallization from ethanol-water gives 5,6-dichloro-7-sulfamyl-1,2,4-benzothiadiazine-1,1-dioxide, M.P. 355–356° C.

Analysis.—Calculated for $C_7H_5Cl_2N_3O_4S_2$: C, 25.46; H, 1.53; N, 12.72. Found: C, 25.88; H, 1.61; N, 12.74.

Step C.—By replacing the benzothiadiazine employed in Example 2 by an equivalent quantity of the 5,6-dichloro-7-sulfamyl-1,2,4-benzothiadiazine-1,1-dioxide, obtained as described above, and following substantially the same procedure described in Example 2, there is obtained 7-butyrylsulfamyl - 5,6 - dichloro - 1,2,4 - benzothiadiazine-1,1-dioxide.

EXAMPLE 20

*7-Butyrylsulfamyl-5,6-Dichloro-3,4-Dihydro-1,2,4-Benzothiadiazine-1,1-Dioxide*

The 7 - butyrylsulfamyl-5,6-dichloro-1,2,4-benzothiadiazine-1,1-dioxide, prepared as described in Example 19, is reduced by substantially the same method described in Example 14 to give 7-butyrylsulfamyl-5,6-dichloro-3,4-dihydro-1,2,4-benzothiadiazine-1,1-dioxide.

EXAMPLE 21

*7-Butyrylsulfamyl-6-Chloro-5-Iodo-1,2,4-Benzothiadiazine-1,1-Dioxide*

Step A.—A solution of iodine monochloride (21.1 g., 0.13 mole) in concentrated hydrochloric acid (50 ml.) is added dropwise over 30 minutes to a solution of 5-chloro-2,4-disulfamylaniline (25.3 g., 0.09 mole) in concentrated hydrochloric acid (350 ml.) maintained at 98° C. After stirring at 98° for 24 hours, the mixture is cooled to 5° and the product collected on a sintered glass funnel, washed with water, and dried. Recrystallization from ethanol-water gives 5-chloro-2,4-disulfamyl-6-iodoaniline, M.P. 308–309° C.

Analysis.—Calculated for $C_6H_7ClIN_3O_4S_2$: C, 17.51; H, 1.71; N, 10.21. Found: C, 17.96; H, 1.83; N, 10.10.

Step B.—By replacing the 5,6-dichloro-2,4-disulfamylaniline employed in Example 19, Step B, by an equivalent quantity of 5-chloro-2,4-disulfamyl-6-iodoaniline, and following substantially the procedure described in Example 19, Step B, there is obtained 6-chloro-5-iodo-7-sulfamyl-1,2,4-benzothiadiazine-1,1-dioxide which, when recrystallized from dimethylformamide-water melts at 376–377° C.

Analysis.—Calculated for $C_7H_5ClIN_3O_4S_2$: C, 19.94; H, 1.20; N, 9.97. Found: C, 20.40; H, 1.24, N, 9.85.

Step C.—The product thus obtained can be acylated with butyric anhydride by substantially the same method described in Example 2 to give 7-butyrylsulfamyl-6-chloro-5-iodo-1,2,4-benzothiadiazine-1,1-dioxide.

EXAMPLE 22

*7-butyrylsulfamyl-6-Chloro-5-Iodo-3,4-Dihydro-1,2,4-Benzothiadiazine-1,1-Dioxide*

The 7-butyrylsulfamyl-6-chloro-5-iodo-1,2,4-benzothiadiazine-1,1-dioxide, prepared as described in Example 21, can be reduced by substantially the same method described in Example 14 to yield 7-butyrylsulfamyl-6-chloro-5-iodo-3,4-dihydro-1,2,4-benzothiadiazine-1,1-dioxide.

The dihydro compounds described in Examples 20 and 22 can also be prepared by first making the un-acylated dihydro compound and then treating said dihydro compound with the desired acylating agent to convert the 7-sulfamyl group to a 7-acyl-sulfamyl group. This is exemplified by the following examples.

EXAMPLE 23

*7-Butyrylsulfamyl-5,6-Dichloro-3,4-Dihydro-1,2,4-Benzothiadiazine-1,1-Dioxide*

Step A.—A mixture of 2.5 g. of 5,6-dichloro-2,4-disulfamylaniline and 0.47 g. of paraformaldehyde in 25 ml. of ethanol and 25 ml. of 6 N hydrochloric acid is heated on the steam bath for one hour and cooled in an ice bath. The product is collected on the filter, washed with water and recrystallized from ethanol-water to give 5,6 - dichloro - 7 - sulfamyl - 3,4 - dihydro - 1,2,4-benzothiadiazine-1,1-dioxide, M.P. 288–289° C.

Analysis.—Calculated for $C_7H_7Cl_2N_3O_4S_2$: C, 25.31; H, 2.12; N, 12.65. Found: C, 25.63; H, 2.31; N, 12.62.

Step B.—The dihydro compound thus obtained can be acylated with butyric anhydride by substantially the same method described in Example 2 to give 7-butyrylsulfamyl-5,6 - dichloro - 3,4 - dihydro - 1,2,4 - benzothiadiazine-1,1-dioxide.

EXAMPLE 24

*7-Butyrylsulfamyl-6-Chloro-5-Iodo-3,4-Dihydro-1,2,4-Benzothiadiazine-1,1-Dioxide*

Step A.—By replacing the 5,6-dichloro-2,4-disulfamylaniline in Example 23, Step A, by an equivalent quantity of 5-chloro-2,4-disulfamyl-6-iodoaniline and following substantially the same procedures described in Steps A and B of Example 23, there is obtained 7-butyrylsulfamyl-6 - chloro - 5 - iodo - 3,4 - dihydro - 1,2,4 - benzothiadiazine-1,1-dioxide.

It is possible to prepare other 5-substituted-2,4-disulfamyl-6-haloanilines, e.g., those wherein the 5-substituent is a halogen or a halogen-like radical such as chlorine, bromine, fluorine, trihalomethyl as trifluoromethyl, trichloromethyl, and the like; a lower alkyl as methyl, ethyl, propyl, isopropyl, butyl, amyl and the like; a lower alkoxy as methoxy, ethoxy, butoxy and the like; nitro or amino, by following substantially the same procedures described in Example 19, Step A, or Example 21, Step A, and employing the appropriately 5-substituted-2,4-disulfamyl-aniline such as are described in U.S. Patent 2,809,194.

The 5 - substituted - 2,4 - disulfamyl - 6 - haloanilines described above can be cyclized to the corresponding 6-substituted - 5 - halo - 7 - sulfamyl - 1,2,4 - benzothiadiazine-1,1-dioxide by substantially the same procedures described in Example 19, Step B, or Example 21, Step B; or they can be cyclized to the corresponding 6-substituted-5-halo - 7 - sulfamyl - 3,4 - dihydro - 1,2,4 - benzothiadiazine-1,1-dioxide by substantially the same method described in Example 23, Step A. The 6-substituent will, of course, be selected from the same radicals included in the above definition of the 5-substituent attached to the aniline starting material. The halogen attached to the 6-position of the aniline compound and to the 5-position of the benzothiadiazines are advantageously selected from chlorine, bromine, and iodine.

The 5-substituted-2,4-disulfamyl-6-haloanilines, the 6-substituted-5-halo-7-sulfamyl-1,2,4-benzothiadiazines and the 6-substituted-5-halo-7-sulfamyl-3,4-dihydro-1,2,4-benzothiadiazine-1,1-dioxide compounds described above are novel compounds useful as starting materials for preparing the novel 7-acylsulfamyl-benzothiadiazines described hereinbefore and additionally they possess useful diuretic properties.

Tle alkali metal salts of the 1-acylsulfamyl compounds of this invention can be prepared by dissolving the selected compound in an aqueous or alcoholic solution of the alkali metal hydroxide, and, if desired, isolating the salt by evaporating the solvent. Any of the conventional alkali metal salts, such as potassium, sodium, lithium, and the like salts, can be prepared by this method or by other methods known to organic chemists.

The dosage of the 7-acylsulfamyl compounds of this invention will vary over a wide range and for this reason, tablets, pills, capsules, syrups, elixirs, injectable solutions, and the like containing per unit dosage from about 25 mg. to about 300 mg. or more of the active ingredient can be made available to the physician for the symptomatic adjustment of the dosage to the individual patient. As these compounds can be put up in suitable dosage forms by methods known to pharmacists, the following example illustrates only one of the many methods by which these compounds can be compounded.

EXAMPLE 25

*Compressed Tablet Comprising 50 Mg. of Active Ingredient*

| | Per Tablet, Mg. |
|---|---|
| 7 - butyrylsulfamyl - 6 - chloro - 1,2,4 - benzothiadiazine-1,1-dioxide | 50 |
| Starch U.S.P. | 20.2 |
| Lactose | 26.5 |
| Magnesium stearate | 0.5 |
| | 97.2 |

The 7 - butyrylsulfamyl - 6 - chloro - 1,2,4 - benzothiadiazine-1,1-dioxide, part of the starch and all of the lactose are mixed together and granulated with a sufficient quantity of starch paste, prepared from the balance of the starch. The granulation (14 mesh) is dried at 45° C. for 20 hours and then rescreened 16 mesh. The magnesium stearate then is screened through a No. 90 bolting cloth onto the granulation and the entire quantity blended. The granulation is pressed into tablets of appropriate size on a machine using flat-faced, double-edged punches with a score.

While the above examples describe the perparation of certain compounds which are illustrative of the novel compounds of this invention, and a certain specific dosage form suitable for administering the novel compounds in therapy, and a novel method by which these compounds can be prepared, it is to be understood that the invention is not to be limited by the examples or by the specific reaction conditions described for the preparation of the compounds or by the specific ingredients included in the pharmaceutical preparation but is understood to embrace variations and modifications falling within the scope of the appended claims.

What is claimed is:

1. A compound selected from the group consisting of 3 - $R^3$ - 5 - X - 6 - $R^1$ - 7 - (acylsulfamyl) - 1,2,4 - benzothiadiazine-1,1-dioxide and 3-$R^3$-5-X-6-$R^1$-7-(acylsulfamyl) - 3,4 - dihydro - 1,2,4 - benzothiadiazine - 1,1 - dioxide, wherein in each of the foregoing compounds $R^1$ is selected from the group consisting of halogen, lower-alkyl, lower alkoxy and nitro;

$R^3$ is selected from the group consisting of hydrogen, lower-alkyl, halo lower-alkyl, phenyl, benzyl, and pentamethylene which forms a cyclohexyl ring with the 3-position nuclear carbon atom to which it is attached;

X is selected from the group consisting of hydrogen and halogen;

and acyl is an organic monocarbonyl selected from the group consisting of lower aliphatic-monocarbonyl, phenyl-monocarbonyl, phenyl - lower - alkyl - monocarbonyl, thiophene-monocarbonyl, and pyridine-monocarbonyl.

2. 7 - (lower - alkanoylsulfamyl) - 6 - halo - 1,2,4 - benzothiadiazine-1,1-dioxide.

3. 7 - benzoylsulfamyl - 6 - halo - 1,2,4 - benzothiadiazine-1,1-dioxide.

4. 7-butyrylsulfamyl - 6 - chloro - 1,2,4 - benzothiadiazine-1,1-dioxide.

5. 7-butyrylsulfamyl - 6 - trifluoromethyl - 1,2,4 - benzothiadiazine-1,1-dioxide.

6. 7 - (lower - alkanoylsulfamyl) - 6 - halo - 3,4 - dihydro-1,2,4-benzothiadiazine-1,1-dioxide.

7. 7 - butyrylsulfamyl - 6 - chloro - 3,4 - dihydro - 1,2,-4-benzothiadiazine-1,1-dioxide.

8. 7-butyrylsulfamyl - 6 - trifluoromethyl - 3,4 - dihydro-1,2,4-benzothiadiazine-1,1-dioxide.'

9. 7 - (lower - alkanoylsulfamyl) - 5,6 - dihalo - 1,2,4-benzothiadiazine-1,1-dioxide.

10. 7 - (lower - alkanoylsulfamyl) - 5,6 - dihalo - 3,4-dihydro - 1,2,4-benzothiadiazine-1,1-dioxide.

References Cited in the file of this patent

UNITED STATES PATENTS

| 2,383,859 | Hentrich et al. | Aug. 28, 1945 |
| 2,894,948 | DeStevens et al. | July 14, 1959 |

OTHER REFERENCES

Migrdichian: Organic Synthesis, pp. 1694 and 1733 (1957).